(12) United States Patent
Blair

(10) Patent No.: US 12,539,930 B2
(45) Date of Patent: Feb. 3, 2026

(54) MOTORIZED SUPPLEMENTAL TRAILER AXLE

(71) Applicant: Andrew Blair, Castlerock, CO (US)

(72) Inventor: Andrew Blair, Castlerock, CO (US)

(*) Notice: Subject to any disclaimer, the term of this patent is extended or adjusted under 35 U.S.C. 154(b) by 214 days.

(21) Appl. No.: 17/500,036

(22) Filed: Oct. 13, 2021

(65) Prior Publication Data

US 2022/0111916 A1 Apr. 14, 2022

Related U.S. Application Data

(60) Provisional application No. 63/091,176, filed on Oct. 13, 2020.

(51) Int. Cl.
*B62D 59/04* (2006.01)
*B60K 1/00* (2006.01)
*B60K 1/04* (2019.01)
*B60L 50/50* (2019.01)

(52) U.S. Cl.
CPC .............. *B62D 59/04* (2013.01); *B60K 1/04* (2013.01); *B60L 50/50* (2019.02); *B60K 2001/001* (2013.01); *B60K 2001/005* (2013.01); *B60L 2200/28* (2013.01); *B60W 2300/14* (2013.01)

(58) Field of Classification Search
CPC ........ B62D 59/00; B62D 59/02; B62D 59/04; B60K 1/04; B60K 2001/001
See application file for complete search history.

(56) References Cited

U.S. PATENT DOCUMENTS

| 3,860,081 | A | | 1/1975 | Moll et al. | |
|---|---|---|---|---|---|
| 4,095,665 | A | * | 6/1978 | Armfield | B60K 1/00 180/65.285 |
| 4,140,194 | A | * | 2/1979 | Moreau | B60K 17/10 477/6 |
| 4,316,132 | A | * | 2/1982 | Geppert | B60L 50/66 318/811 |
| 4,771,838 | A | * | 9/1988 | Ketcham | B62D 13/00 180/6.62 |
| 5,696,438 | A | * | 12/1997 | Hamilton | B60K 6/40 903/951 |
| 6,945,343 | B1 | | 9/2005 | Moreau et al. | |
| 7,147,070 | B2 | | 12/2006 | Leclerc | |
| 7,514,803 | B2 | | 4/2009 | Wilks | |
| 7,743,859 | B2 | | 6/2010 | Forsyth | |

(Continued)

*Primary Examiner* — James A Shriver, II
(74) *Attorney, Agent, or Firm* — Boudwin Intellectual Property Law, LLC; Daniel Boudwin

(57) ABSTRACT

A motorized supplemental trailer axle includes an axle securable to a trailer and having a wheel affixed to opposing ends thereof. A motor for powering the axle wheels is operably connected to a battery power supply. A transfer case having a clutch mechanism is operably connected to the motor and the axle, wherein the clutch mechanism is configured to selectively engage the motor with the axle to rotate the pair of wheels. A control module includes a sensor configured to monitor rotational speed of the pair of axle wheels, a processor, a non-transitory computer readable medium operatively connected to the processor, and a logic that, when executed by the processor, causes the system to calculate a wheel speed of a vehicle currently towing the trailer and activate the motor to rotate the wheels of the trailer axle at a speed that matches the towing vehicle's wheel speed.

9 Claims, 3 Drawing Sheets

(56) References Cited

U.S. PATENT DOCUMENTS

| | | | | |
|---|---|---|---|---|
| 2007/0194557 | A1* | 8/2007 | Caporali | B62D 12/02 |
| | | | | 280/493 |
| 2008/0169144 | A1* | 7/2008 | DeGrave | B60L 50/40 |
| | | | | 180/165 |
| 2011/0079453 | A1* | 4/2011 | Wanger | B62M 7/16 |
| | | | | 180/11 |
| 2013/0066496 | A1* | 3/2013 | Ishii | B60W 10/30 |
| | | | | 180/65.285 |
| 2014/0025245 | A1* | 1/2014 | Fanourakis | B62D 53/0871 |
| | | | | 280/433 |
| 2017/0349078 | A1* | 12/2017 | Dziuba | B60H 1/00428 |
| 2018/0304944 | A1* | 10/2018 | Wright | B62D 53/08 |
| 2019/0152297 | A1* | 5/2019 | Chopko | F25D 11/003 |
| 2019/0202511 | A1* | 7/2019 | Hößle | B60W 40/105 |
| 2020/0353806 | A1* | 11/2020 | Knoche | B60K 1/00 |

\* cited by examiner

MOTORIZED SUPPLEMENTAL TRAILER AXLE

CROSS REFERENCE TO RELATED APPLICATIONS

This application claims the benefit of U.S. Provisional Application No. 63/091,176, filed on Oct. 13, 2020. The above identified patent application is herein incorporated by reference in its entirety to provide continuity of disclosure.

BACKGROUND OF THE INVENTION

The present invention relates to trailers and other towed vehicles. More specifically, the present invention provides a motorized supplemental trailer axle for attachment to an existing trailer. The motorized supplemental trailer axle includes an independent motor that powers the supplemental axle's wheels, which can be automatically adjusted to match the wheel speed of the towing vehicle.

Trailers are typically unpowered wheeled vehicles that are towed behind a powered vehicle. Trailers come in many forms and are used by many individuals and businesses alike to transport items and materials that are too large or otherwise unsuitable for transportation in the towing vehicle. While trailers provide a useful means for transporting items and materials, they are not without drawbacks. For example, the fact that most trailers are unpowered makes it difficult if not impossible to move the trailer without it being attached to a powered towing vehicle. Additionally, the added weight and aerodynamic drag of the trailer can reduce the fuel efficiency of the towing vehicle. This can cause wear and tear on the towing vehicle over time. Further, some vehicles may not be powerful enough to tow a desired trailer. It can be prohibitively expensive to pay for a new vehicle or to pay the increased vehicle maintenance costs incurred by frequent trailer towing. In view of the above concerns, it is desirable to provide a motorized supplemental trailer axle which can be secured to an existing trailer and can be utilized to supplement the power of the towing vehicle, thereby reducing the stress on the towing vehicle over time and increasing the towing vehicle's fuel efficiency.

Devices have been disclosed in the known art that relate to trailers with powered axles and wheels. These include devices that have been patented and disclosed in patent application publications. However, the devices in the known art have several drawbacks. For example, traditional trailers typically lack independent motors that allow the trailer to be moved under its own power. Some trailers include some form of power to the wheels, but lack a means of matching the wheel speed of the trailer to the wheel speed of the towing vehicle. Further, the trailers in the known art that do include some form of onboard battery power lack an efficient means for keeping the onboard battery or batteries charged. The devices in the known art also lack the ability to be used with different types and sizes of trailers.

In light of the devices disclosed in the known art, it is submitted that the present invention substantially diverges in design elements from the known art and consequently it is clear that there is a need in the art for an improvement to existing trailers and trailer axle devices. In this regard the present invention substantially fulfills these needs.

SUMMARY OF THE INVENTION

The present invention provides a motorized supplemental trailer axle wherein the same can be utilized for providing a mechanism for supplementing the power of the towing vehicle, in order to reduce the fuel consumption and stress on the towing vehicle. The supplemental powered vehicle axle includes an axle having a wheel affixed to opposing ends thereof. A motor for powering the axle wheels is operably connected to a battery power supply. A transfer case having a clutch mechanism is operably connected to the motor and the axle, wherein the clutch mechanism is configured to selectively engage the motor with the axle to rotate the pair of wheels. A control module includes a sensor configured to monitor the rotational speed of the pair of axle wheels, as well as a processor, a non-transitory computer readable medium operatively connected to the processor, and a logic stored in the non-transitory computer readable medium that, when executed by the processor, causes the system to calculate a wheel speed of a vehicle currently towing the trailer and activate the motor to rotate the wheels of the motorized supplemental trailer axle at a speed that matches the towing vehicle's wheel speed.

One object of the present invention is to provide a motorized supplemental trailer axle that can be configured to match the towing vehicle's wheel speed via automatic adjustment of the supplemental axle's independent motor.

A further object of the present invention is to provide a motorized supplemental trailer axle that includes an alternator and/or other means for charging the dedicated battery that powers the axle's motor.

Another object of the present invention is to provide a motorized supplemental trailer axle that can be removably secured to a trailer so as to be usable with different trailers.

Other objects, features and advantages of the present invention will become apparent from the following detailed description taken in conjunction with the accompanying drawings.

BRIEF DESCRIPTION OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 2:
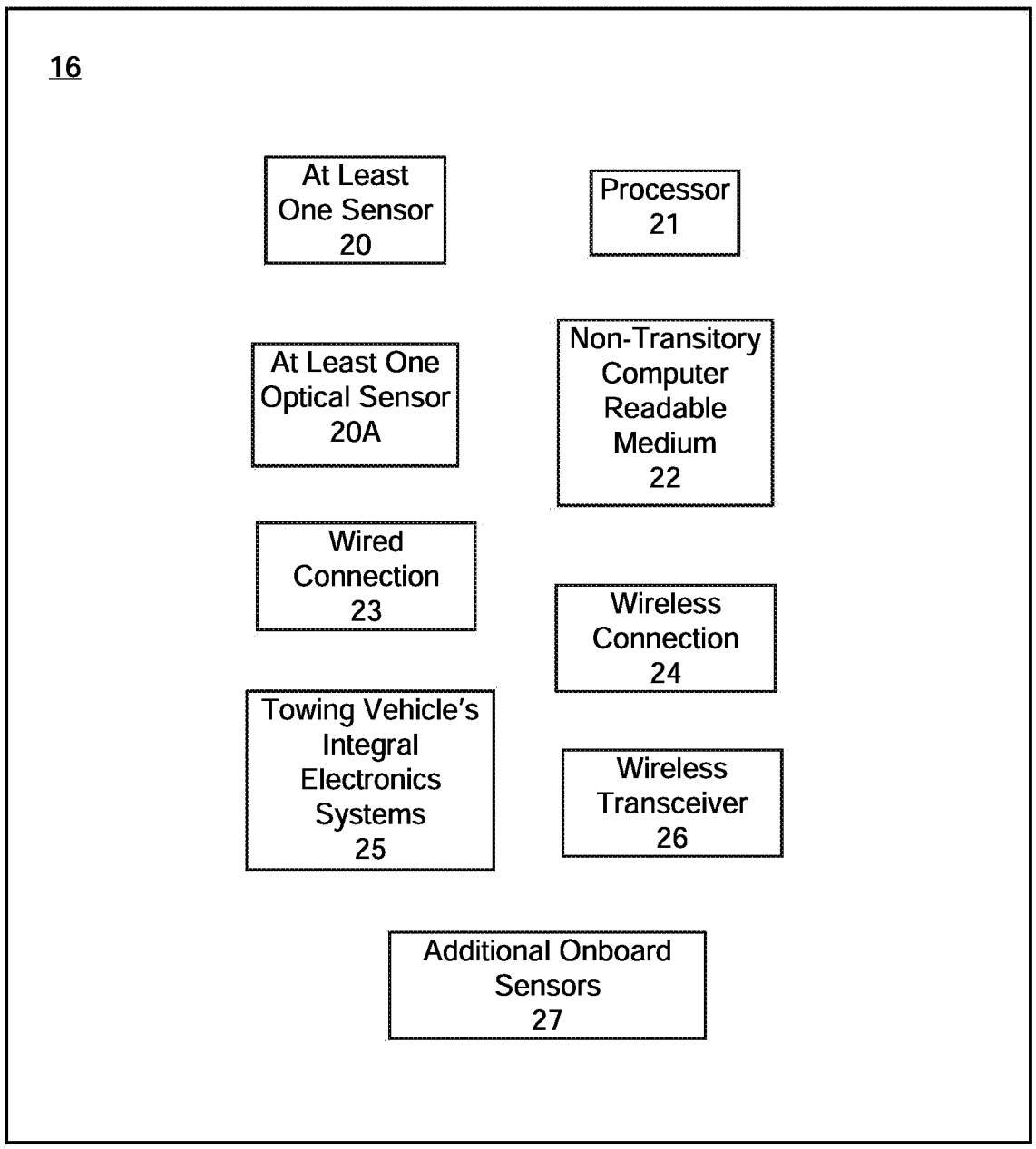

FIG. 2 shows a block diagram of a control module.

Figure 3:
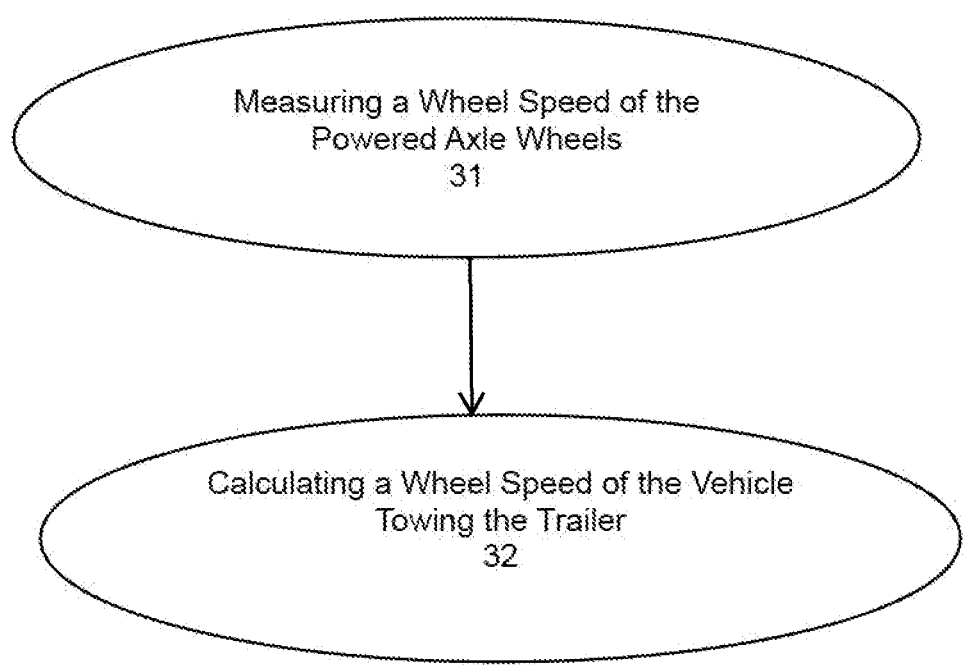

FIG. 3 shows a flowchart of a method for determining a towing vehicle wheel speed from a motorized supplemental trailer axle system.

According to some embodiments, the operations, techniques, and/or components described herein can be implemented as (i) a special-purpose computing device having specialized hardware and a logic hardwired into the computing device to persistently perform the disclosed operations and/or techniques or (ii) a logic that is implementable on an electronic device having a general purpose hardware processor to execute the logic and a computer-readable medium, e.g. a memory, wherein implementation of the logic by the processor on the electronic device provides the electronic device with the function of a special-purpose computing device.

In the interests of economy, the present disclosure refers to "a computer-readable medium," "a processor," and so on. However, this should not be read as limiting in any way as the present disclosure contemplates embodiments of the present invention utilizing "one or more computer-readable media," "one or more processors," and so on. Unless specifically limited to a single unit, "a" is intended to be equivalent to "one or more" throughout the present disclosure. As used herein, the term "processor" can refer to any electronic circuit which performs operations on some external source. As used herein, the term "logic" can include any combination of computer software instructions, integrated circuit-based logic gates, switch or junction-based logic gates, etc. As used herein, the term "memory" can refer to any non-transitory computer readable medium, including but not limited to simple circuit states via logic gates or switch positions, as well as solid state computer readable storage.

According to some embodiments, the operations, techniques, and/or components described herein can be implemented by an electronic device, which can include any combination of digital and analogue circuitry, as well as one or more special-purpose computing devices. The special-purpose computing devices can be hard-wired to perform the operations, techniques, and/or components described herein, or can include digital electronic devices such as one or more application-specific integrated circuits (ASICs) or field programmable gate arrays (FPGAs) that are persistently programmed to perform the operations, techniques and/or components described herein, or can include one or more general purpose hardware processors programmed to perform such features of the present disclosure pursuant to program instructions in firmware, memory, other storage, or a combination. Such special-purpose computing devices can also combine custom hard-wired logic, ASICs, or FPGAs with custom programming to accomplish the technique and other features of the present disclosure. The special-purpose computing devices can be desktop computer systems, portable computer systems, handheld devices, networking devices, or any other device that incorporates hard-wired and/or program logic to implement the techniques and other features of the present disclosure.

Reference is made herein to the attached drawings. Like reference numerals are used throughout the drawings to depict like or similar elements of the supplemental powered vehicle axle. For the purposes of presenting a brief and clear description of the present invention, a preferred embodiment will be discussed as used for providing a motorized supplemental trailer axle for a trailer with automated control systems that allow the supplemental axle's wheel speed to match the towing vehicle's wheel speed. The drawings are intended for representative purposes only and should not be considered to be limiting in any respect.

Figure 1:
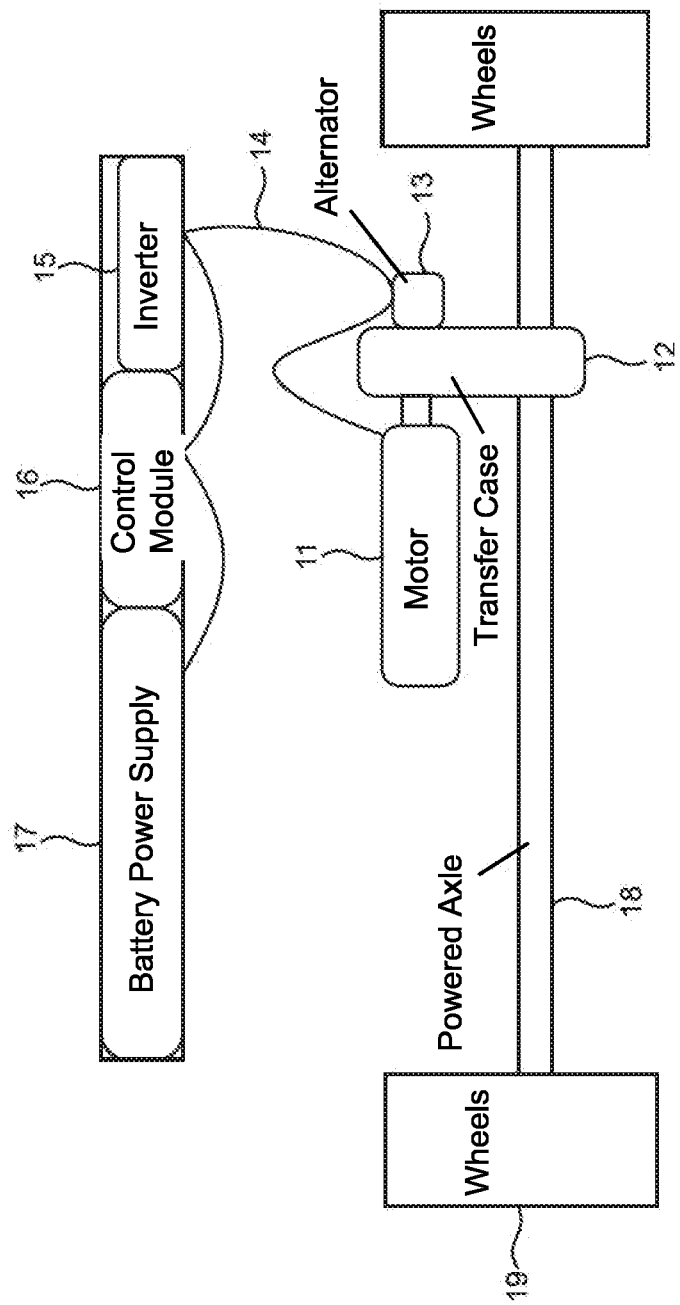
FIG. 1 shows a block diagram of the components of an embodiment of the motorized supplemental trailer axle system.

Referring now to FIG. 1, there is shown a block diagram of the components of an embodiment of the motorized supplemental trailer axle. The motorized supplemental trailer axle includes an axle 18 that can be permanently or removably attached to a trailer. The attachment means can include any suitable fasteners for securing the axle 18 to the trailer. In one embodiment, the axle 18 may be mountable adjacent the existing rear axle of the trailer. In another embodiment, the axle 18 can be mountable more toward the front, at the trailer tongue, for example. In embodiments where the axle 18 is removable, the device can be interchangeably used with different trailers of different types and sizes.

A wheel 19 is affixed to each opposing end of the supplemental axle 18. The wheels 19 can include standard rubber tires, the type and size of which can vary depending on the end use of the present invention. A motor 11 is operably connected to the axle 18 via a transfer case 12 that is mounted to the axle 18. The motor 11 can be any suitable type of electric motor. The transfer case 12 includes a clutch mechanism that is configured to selectively engage the axle 18 and rotate the wheels 19 under power from the motor 11. The motor 11 includes a drivetrain that transfers its energy to mechanical motion of the axle 18 and wheels 19. In one embodiment, the drivetrain is a parallel drive mechanism with a driveshaft extending from the motor into the transfer case, wherein a parallel gearing mechanism selectively transfers the rotational motion of the driveshaft to the axle 18 and wheels 19 when the clutch mechanism is engaged. When the clutch mechanism is disengaged, the wheels 19 are able to freely rotate.

The motor 11 is powered via a battery power supply 17. In some embodiments, an alternator 13 is operably connected to the transfer case 12 and to the axle 18. The connection is such that rotation of the axle 18 causes corresponding rotation of the internal components of the alternator 13. This generates energy which is routed to the battery power supply 17. In this way, the mechanical energy from the movement of the axle 18 or wheels 19 can be partially recaptured and stored as additional electrical energy for the battery power supply 17, thereby extending the operating time between charges or replacement.

In some embodiments, the alternator 13 is operably connected to a power inverter 15. The power inverter 15 is configured to convert the voltage of the electricity generated via the alternator 13 to the appropriate voltage level for storing the electrical energy in the battery power supply 17. The motor 11 and alternator 13 connect to the power inverter 15 and the battery power supply 17 via a wiring harness 14. In some embodiments, the motorized supplemental trailer axle includes additional mechanisms for recharging the battery power supply 17, such as onboard solar cells, as one example. In yet another embodiment, the motorized supplemental trailer axle can be powered via an electrical connection with the towing vehicle's battery, however most embodiments will include a dedicated battery power supply 17.

Referring now to FIG. 2 there is shown a block diagram of a control module 16.

The motorized supplemental trailer axle system 10 further includes a control module 16 that controls the operation of the motor 11 and transfer case 12. The control module 16 is powered via the onboard battery power supply 17 through the wiring harness connection 14. The control module 16 includes at least one sensor 20 that is configured to monitor rotational speed of the pair of wheels 19. The at least one sensor 20 can be at least one optical sensor 20A or any other suitable type of sensor that can measure rotational movement of the axle components or the wheels 19. The control module 16 also includes a processor 21, a non-transitory computer readable medium 22 operatively connected to the processor 21, and a logic stored in the non-transitory computer readable medium 22 that, when executed by the processor 21, causes the system to perform a desired method of operation.

The method of operation includes calculating, receiving, or determining a wheel speed of the towing vehicle. This can be accomplished via a wired connection 23 or a wireless connection 24 between the control module and the towing vehicle's integral electronics systems 25. The wireless connection can be accomplished via a wireless transceiver 26. The towing vehicle wheel speed may also be measured via additional onboard sensors 27.

As the towing vehicle wheel speed is determined, the control module 16 activates the motor 11 and engages the clutch mechanism to rotate the wheels 19 of the axle 18 at a speed that matches the towing vehicle's wheel speed. This provides enhanced control of the trailer as well as an improvement to overall vehicle fuel economy and a reduction of stress applied to the towing vehicle. If the wheel speed of the supplemental axle's wheels 19 is less than a wheel speed of the towing vehicle's wheels, then the control module 16 activates the motor and engages the clutch mechanism with the powered axle 18, at least until the towing vehicle wheel speed is reached by the axle wheels 19. If the wheel speed of the powered axle wheels 19 is greater than a wheel speed of the towing vehicle's wheels, then the control module 16 disengages the clutch mechanism from the powered axle 18.

FIG. 3 shows a flowchart of a method for determining a towing vehicle wheel speed from a motorized supplemental trailer axle system 30.

The overall method steps 30 include measuring a wheel speed of the powered axle wheels 31 and calculating a wheel speed of the vehicle towing the trailer 32.

In one of many examples uses, the motorized supplemental trailer axle may be coupled to a towed camper or RV trailer. The wiring harnesses 14 can include conversion boxes that allow different types of trailer connections to be utilized with the present invention. For example, the conversion box can include connections and outlets for both four and seven pin type connections that are common with most trailers. This allows the trailer's electronics such as the automatic brakes or lights to function and be operably connected to the powered axle. The axle 18 may be removably mounted to the RV trailer, so as to be interchangeable with different types and sizes of trailers. In this way, the motorized supplemental trailer axle can be utilized for many different purposes when providing supplemental power to a trailer as it is towed.

It is therefore submitted that the present invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, and all equivalent relationships to those illustrated in the drawings and described in the specification are intended to be encompassed by the present invention.

The foregoing is considered as illustrative only of the principles of the invention. Further, it is not desired to limit the invention to the exact construction and operation shown and described, and accordingly, all suitable modifications and equivalents may be resorted to, falling within the scope of the invention.

I claim:

1. A motorized supplemental trailer axle system, comprising:
an axle attached to a trailer, the axle having a wheel affixed to opposing ends thereof;
a motor operably connected to a battery power supply;
a transfer case having a clutch mechanism operably connected to the motor and the axle;
wherein the clutch mechanism is configured to selectively engage the motor with the axle to rotate the pair of wheels;
a control module having at least one sensor to monitor rotational speed of the pair of wheels, a processor, a non-transitory computer-readable storage medium operatively connected to the processor, and a logic stored in the non-transitory computer-readable storage medium; and
a network connection adapted to connect the control module and a towing vehicle's integral electronics systems;
further comprising an alternator operably connected to the transfer case and to the battery power supply, such that rotation of the axle causes corresponding rotation in the alternator, which in turn charges the battery power supply;
wherein the at least one sensor configured to monitor rotational speed of the pair of wheels is at least one optical sensor;
wherein the processor is selected from the group consisting of a custom hard-wired logic, one or more application-specific integrated circuits, or one or more field programmable gate arrays; and
further comprising a power inverter operably connected between the alternator and the battery power supply;
wherein the power inverter is configured to adjust a voltage of the alternator to an appropriate voltage for charging the battery power supply.

2. The motorized supplemental trailer axle system of claim 1, further comprising an additional sensor configured to monitor a rotational speed of the towing vehicle's wheels.

3. The motorized supplemental trailer axle system of claim 1, further comprising a wiring harness configured to connect the control module to an electrical system of the towing vehicle.

4. The motorized supplemental trailer axle system of claim 1, wherein the axle is removably attached to an existing rear axle of the trailer.

5. The motorized supplemental trailer axle system of claim 1, wherein the axle is removably attached to a trailer tongue of the trailer.

6. The motorized supplemental trailer axle system of claim 1, wherein the motor includes a parallel drive arrangement having a drive shaft that extends parallel to the axle.

7. The motorized supplemental trailer axle system of claim 1, wherein the network connection is a wireless connection.

8. The motorized supplemental trailer axle system of claim 7, wherein the wireless connection is via a wireless transceiver.

9. The motorized supplemental trailer axle system of claim 1, wherein the network connection is a wired connection.

* * * * *